United States Patent [19]
Kitchen

[11] Patent Number: 5,673,049
[45] Date of Patent: Sep. 30, 1997

[54] POLICE RADAR JAMMER

[76] Inventor: William J. Kitchen, 10385 Sailor Ct., Longmont, Colo. 80501

[21] Appl. No.: 591,918

[22] Filed: Jan. 26, 1996

[51] Int. Cl.$^6$ .................... G01S 7/38; H01Q 15/18
[52] U.S. Cl. ........................................ 342/6; 342/14
[58] Field of Search ........................ 342/5, 6, 14, 15

[56] References Cited

U.S. PATENT DOCUMENTS

| | | | |
|---|---|---|---|
| 2,443,643 | 6/1948 | Schelleng | 342/350 |
| 2,472,782 | 6/1949 | Albersheim | 342/6 |
| 3,317,911 | 5/1967 | Stahler et al. | 342/5 X |
| 3,371,345 | 2/1968 | Lewis | 342/6 |
| 3,787,856 | 1/1974 | Pyrah | 342/6 |
| 3,806,926 | 4/1974 | Page | 342/14 |
| 4,233,605 | 11/1980 | Coleman | 342/6 |
| 4,271,411 | 6/1981 | Takashi | 342/175 |
| 4,370,654 | 1/1983 | Krutsch | 342/6 |
| 4,419,669 | 12/1983 | Slager et al. | 342/6 |
| 4,517,569 | 5/1985 | Gerharz | 342/6 |
| 4,660,046 | 4/1987 | Foral | 342/160 |
| 4,700,191 | 10/1987 | Manor | 342/13 |
| 4,972,192 | 11/1990 | Bruder | 342/6 |
| 5,001,771 | 3/1991 | New | 342/14 X |
| 5,007,721 | 4/1991 | Morris et al. | 342/6 X |
| 5,075,864 | 12/1991 | Sakai | 342/17 X |
| 5,101,209 | 3/1992 | Martin | 342/152 |
| 5,200,753 | 4/1993 | Janusas | 342/14 |
| 5,315,302 | 5/1994 | Katsukura et al. | 342/20 |
| 5,321,405 | 6/1994 | Luck | 342/15 |
| 5,459,468 | 10/1995 | Hartal | 342/7 |
| 5,477,224 | 12/1995 | Sinnock | 342/5 |

*Primary Examiner*—John B. Sotomayor
*Attorney, Agent, or Firm*—Rick Martin

[57] ABSTRACT

A method to confuse a police radar by moving a multiplicity of radar reflector antennas in the field of view of the radar. The moving radar reflector antennas present continuously changing doppler velocities to the police radar. The radar reflectors can be any of several reflective antennas such as dipoles, Yagies, horns, etc. The continuously changing doppler velocities are generated by mounting the radar reflector antennas on a moving disk. The moving disk is driven by an electric motor or by the wind. The radar reflector antennas can also be mounted on the rim or in the tread of a vehicle's tires.

20 Claims, 2 Drawing Sheets

POLICE RADAR JAMMER

FIELD OF INVENTION

The present invention relates to a passive jamming technique used to mask the true velocity of a vehicle from a radar gun.

BACKGROUND OF THE INVENTION

Radar chaff has been used for years as a radar countermeasure to mask the activities of friendly forces from threat radars. The chaff is used to form a chaff cloud consisting of thousands of fine wire clippings, paper backed metal foil, or carbon fibers. The chaff is cut to lengths that act as dipoles that reflect a wide range of radar frequencies.

The chaff is dispersed as a defensive measure to screen a target from the attempts of enemy radar to track that target in order to determine its position, course, and speed. Chaff can also mislead or confuse radar guided missiles seeking a target. Dispersed by a rocket launcher from ships or aircraft, a chaff cloud causes intense echoes over a wide arc on a radar scope to mask the intended target that launched the chaff. Chaff can cause the radar to bloom (lights an entire area on the screen) and defeat tracking. When fired away from the target, it can misdirect a missile which detonates in the chaff cloud, overshoots, or bypasses the target. Chaff misleads radar guided missiles in the same way as flares deceive infrared guided missiles.

Although a dipole such as chaff is very effective as a radar reflector a stronger signal return can be achieved by the use of an antenna reflector with gain. Gain in the case of a passive reflector is the ratio of the return signal compared to the return signal that would have been received from a dipole. The gain is achieved by the directional characteristic of the reflector.

A common type of antenna system with gain is one invented years ago by a Japanese electrical engineer, Hidetsugu Yagi. Any antenna using the principles developed by Yagi is known as a "Yagi antenna".

The Yagi system is well known in the art and involves the use of parasitic elements—elements excited by the radiated wave rather than directly by the transmission line. In a transmitting antenna one or more parasitic elements are placed in front of the main element. These parasitic elements are known as "directors" because they direct the wave. Also, another parasitic element is placed behind the driven element. This element is known as the "reflector" because it reflects the wave.

The driven element should be exactly resonant (0.5 $\lambda$ where $\lambda$ is the wavelength of the frequency that the antenna is designed to transmit or receive). The reflector must be longer than 0.5 $\lambda$ by approximately 4% to 6%. The director should be shorter than the driven element by 4% to 6%. All elements are mounted parallel to each other. The directors are in front of the driven element, and the reflector is behind the driven element. In the case of a Yagi reflector antenna a 3 element reflector should achieve a gain of about 8 dB in the forward direction. Additional elements can be used to add more forward gain.

Radar reflectors with gain can also be fabricated as corner cubes and horn antennas. Horn antennas can be made in various shapes (i.e. rectangular, pyramidal, and circular).

Radar reflectors such as dipole chaff and reflectors of various types can be used either to enhance return from a radar target or to jam the threat radar. All of the above are passive techniques which only reflect energy transmitted to the reflector. The teachings noted above are used in the present invention to passively jam police radar. There are also active techniques such as transponders to transmit a signal from a target to an interrogating radar and active jammers which try to overpower and/or confuse the threat radar. The present invention, however, uses only passive techniques to jam police radars.

Police radar guns are used to measure the doppler shift of a radar return from a moving vehicle. This doppler shift is converted to the speed of the vehicle and displayed on the radar gun.

Legal means to defeat the use of police radars are presently in use such as radar detectors to warn the user that he is under surveillance. The use of radar detectors are not entirely satisfactory due to false triggering by signals that are not police radars such as door openers at grocery stores, etc. Also, the police have radars that do not transmit until they have the vehicle in range. Thus, the radar detector only informs the user that he has been caught. Thus, there is a market for a legal device to confuse the radar and save the user the inconvenience of paying a fine. An active jammer is impractical because it would require a transmitter and a transmitter license to use the jammer. Also, an active jammer would require complicated electronics and a power source which would greatly increase the cost of the jammer.

SUMMARY OF THE INVENTION

The primary object of the present invention is to provide a method to thwart the use of a police radar to lock onto the velocity of a vehicle by strongly reflecting the radar signal with a continuously varying doppler velocity component.

Other objects of this invention will appear from the following description and appended claims, reference being had to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
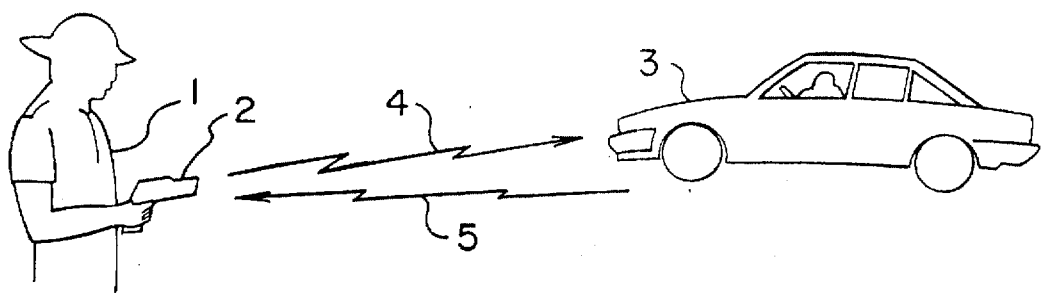
FIG. 1 is a cartoon showing the operation of a police radar gun.

Referring to FIG. 1 (prior art) the usual use of a police doppler radar is shown. The policeman 1 points the radar 2 at a target vehicle 3. The radar 2 can be either hand held or mounted in the police vehicle (not shown). Some of the energy 5 in the radar beam 4 is reflected back to the radar 2. The reflected energy 5 will contain a doppler shift of the carrier frequency proportional to the velocity of the vehicle 3. The energy 5 that is reflected from the vehicle 3 is a diffuse reflection from a non-ideal target. Because the target vehicle 3 is large and the radar 2 is designed for that target 3 the radar 2 will get an acceptable return 5.

Figure 2:
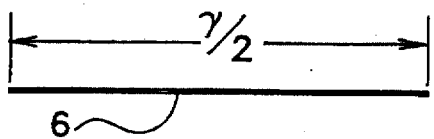
FIG. 2 is a side plane view of a one half wave dipole reflector.

Referring next to FIG. 2 (prior art) a very good return can be achieved from a one-half wave dipole 6. The dipole 6 can be fabricated by a wire, aluminum foil, P.C. board trace, ect. that is one-half of the wave length of the transmitting radar. Police radars transmit in the X band (10.5 $GH_z$ to 10.55 $GH_z$), K band (24.05 $GH_z$ to 24.25 $GH_z$), or the $K_a$ band (34.2 $GH_z$ to 35.2 $GH_z$). These frequencies have one-half wavelength of less than 0.6 inches.

Figure 3:
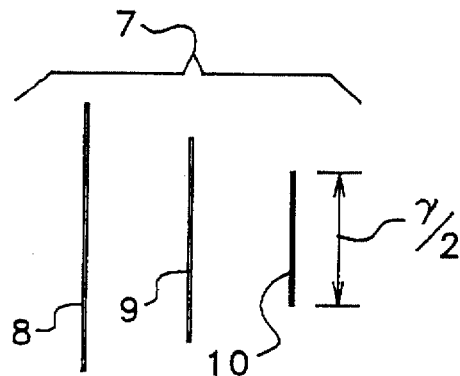
FIG. 3 is a top plane view of a three element Yagi reflector.
Figure 4:
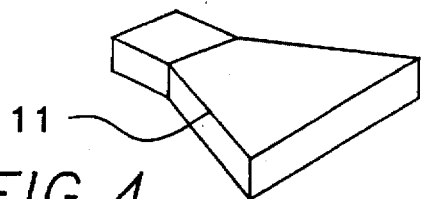
FIG. 4 is a side perspective view of a rectangular horn radar reflector.

Referring next to FIG. 3 (prior art) a reflector called a Yagi antenna 7 is shown. The Yagi antenna 7 can have a stronger reflected return signal in the direction than the Yagi antenna 7 is pointed. A three element Yagi antenna 7 should have a gain of about 8 dB in the forward direction when compared to a dipole 6 of the same frequency and location. Another high gain reflector shown in FIG. 4 (prior art) is a horn antenna 11. The horn antenna 11 in FIG. 4 is a rectangular horn antenna 11. Horns also can be fabricated as pyramidal (not shown) and conical (not shown).

The present invention consists of a plurality of reflector antennas mounted on a moving platform such that an interrogating radar will get a strong return. The return from the reflector antennas will be continuously varying in velocity with respect to the interrogating radar.

Figure 5:
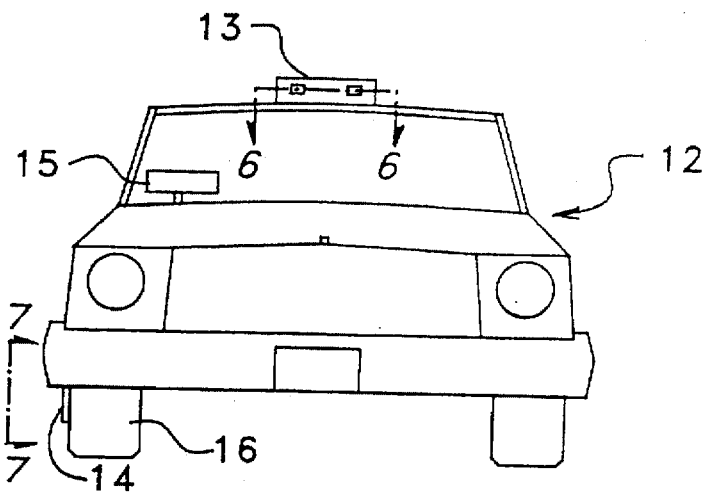
FIG. 5 is a front plane view of an automobile with various embodiments of the invention installed on the vehicle.

FIG. 5 shows several embodiments of the current invention installed on an automobile 12 (a host vehicle).

The invention can be a wind driven device 13 mounted on the outside of the vehicle 12. The invention can be an electric motor driven device 15 mounted any place on the vehicle 12 where electric power is available. The device must be in the field of view of the interrogating radar (not shown). Also, the invention 14 can be mounted on the wheel 16 or hubcap (not shown) of the vehicle 12. When the invention 14 is mounted on the wheel 16 the reflected doppler velocities vary between a minimum of zero and a maximum of two times the velocity of the vehicle 12.

Figure 6:
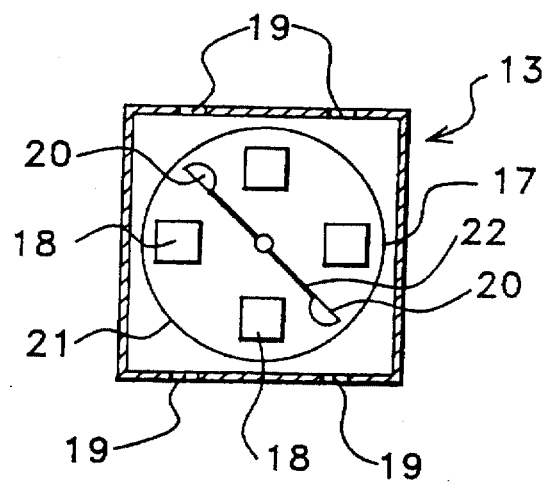
FIG. 6 is a front plane of a wind operated embodiment of the invention.

FIG. 6 shows a wind driven device 13 enclosed in a radome 17 which is transparent to radar signals (not shown).

The radome 17 has holes 19 to allow the air to freely pass through the radome 17. The wind driven device 13 (a windmill) consists of a disk 21 mounted on a shaft 22. The shaft 22 has a bearing (not shown) so that the disk 21 can rotate freely around the shaft 22. Mounted on the disk 21 are anemometer cups 20 so that the relative wind will drive the disk 21. Also mounted on the disk 21 or etched onto the surface of the disk 21 are multiple radar reflector antennas 18. This embodiment of the invention will return doppler velocities that are varying over the ranges of the speed of the vehicle plus and minus the wind speed relative to the vehicle.

Figure 7:
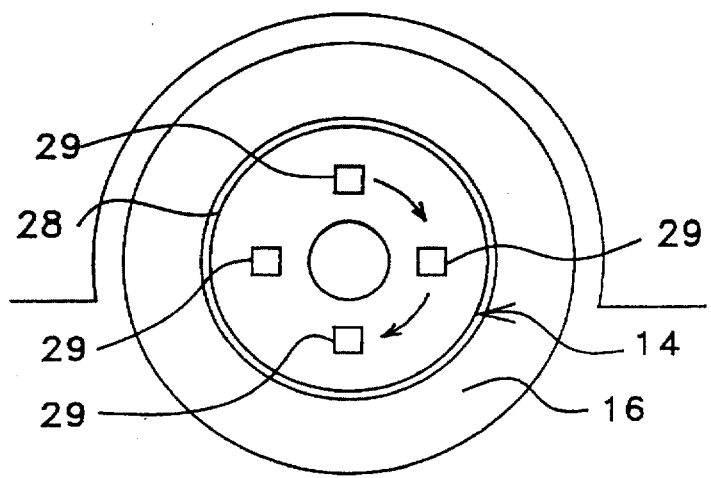
FIG. 7 is a front plane view of the invention mounted on a hubcap or wheel.

Next referring to FIG. 7 the invention 14, comprising multiple radar reflector antennas 29, mounted on a hubcap 28.

The invention 14 can be conformal coated (not shown) or enclosed in a radar transparent material (not shown) so as to provide environmental protection. The radar transparent material can also serve to make the invention 14 look like an ordinary hubcap. The invention 14 will produce a continuously varying velocity signal with a minimum velocity of zero and a maximum velocity of two times the velocity of the vehicle 12.

Figure 8:
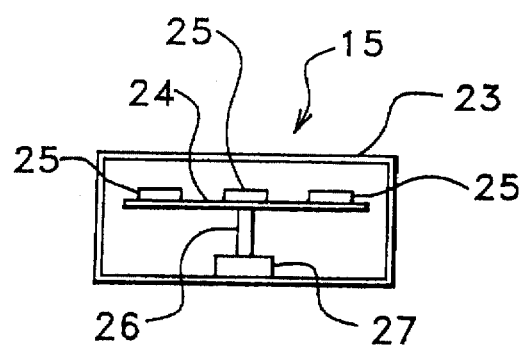
FIG. 8 is a side plane view of an embodiment driven by an electric motor.

Now referring to FIG. 8 an electric motor driven device 15 is shown. The electric motor driven device 15 comprises a radar transparent enclosure 23 which is installed in the vehicle 12 in a location in the field of view of a doppler radar (not shown). This is the preferred embodiment.

The electric motor driven device 15 further comprises a disk 24 on which is mounted a multiplicity of radar reflector antennas 25. The disk 24 is mounted on the shaft 26 of an electric motor 27. The velocity that a doppler radar pointed at the vehicle 12 would see would be varying between the speed of the vehicle 12 minus the speed of the radar reflector antenna 25 and the speed of the vehicle 12 plus the speed of the radar reflector antenna 25.

Note that the orientation of the radar reflector antennas 18, 25, and 29 may not all be oriented in the same direction. In the case of the directional antennas 18, 25, and 29 with gain some may be mounted 180° to the others in order to receive the advancing and receding radar reflections at the doppler radar.

Figure 9:
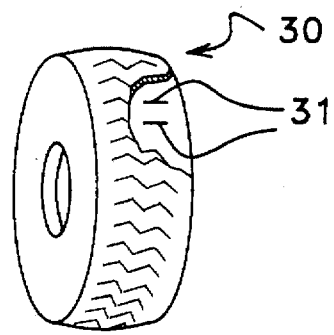
FIG. 9 is a front perspective of a vehicle wheel with dipole chaff embedded in the material of the wheel.

Next, referring to FIG. 9 an automobile tire 30 is fabricated with multiple dipoles 31 mounted in the tread 32 of the tire 30 such that the dipoles 31 are parallel to the surface of the tread 32. This embodiment of the invention 30 will give a doppler velocity that is constantly shifting between zero and two times the velocity of the vehicle 12.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A method to thwart an interrogating doppler radar from detecting the speed of a vehicle comprising the steps of:

mounting a plurality of passive radar reflector antennas on a base, said plurality of passive radar reflector antennas being disposed around a center point of said base;

rotatably mounting said base to the vehicle; and rotating said base about said center point in a field of view of the interrogating doppler radar.

2. The method of claim 1, wherein said passive radar reflector antennas comprise dipoles.

3. The method of claim 1, wherein said passive radar reflector antennas comprise Yagi antenna reflectors.

4. The method of claim 1, wherein said passive radar reflector antennas comprise horn antenna reflectors.

5. The method of claim 1, wherein rotating said base about said center point is powered by wind.

6. The method of claim 1, wherein rotating said base about said center point is powered by an electric motor.

7. The method of claim 1, wherein said step of mounting a plurality of passive radar reflector antennas on a base includes the step of mounting the plurality of radar reflector antennas on a wheel of the vehicle.

8. The method of claim 1, wherein said step of mounting a plurality of passive radar reflector antennas on a base includes the step of mounting the plurality of radar reflector antennas within a tread of a tire of the vehicle.

9. The method of claim 1, wherein said step of mounting a plurality of passive radar reflector antennas on a base includes the step of mounting a plurality of dipole radar reflector antennas on said base.

10. The method of claim 1, wherein said step of mounting a plurality of passive radar reflector antennas on a base includes the step of mounting a plurality of Yagi radar reflector antennas on said base.

11. The method of claim 1, wherein said step of mounting a plurality of passive radar reflector antennas on a base includes the step of mounting a plurality of horn radar reflector antennas on said base.

12. A doppler radar jammer for thwarting an interrogating doppler radar from detecting the speed of a vehicle comprising:

a base rotatably mounted to the vehicle;

a plurality of passive radar reflector antennas located in a field of view of an interrogating doppler radar and mounted on and disposed around a center point of said base; and a means to rotate said base around said center point in the field of view of the interrogating doppler radar for functioning to create a variable return signal from the interrogating doppler radar signal.

13. The radar jammer of claim 12, wherein the means to rotate said base comprises an electric motor.

14. The radar jammer of claim 12, wherein the means to rotate said base comprises a windmill.

15. The radar jammer of claim 12, wherein said base includes a hubcap of the vehicle.

16. The radar jammer of claim 12, wherein said base includes a tire of the vehicle and said passive radar reflector antennas are mounted within a tread of said tire.

17. The radar jammer of claim 16, wherein said passive radar reflector antennas include dipoles.

18. The radar jammer of claim 16, wherein said passive radar reflector antennas include Yagi antennas.

19. The doppler radar jammer of claim 12 further comprising:

a radar transparent enclosure enclosing said rotatably mounted base.

20. The radar jammer of claim 19, wherein the means to rotate the base comprises an electric motor powered by the vehicle.

* * * * *